(12) United States Patent
Park

(10) Patent No.: US 12,466,370 B2
(45) Date of Patent: *Nov. 11, 2025

(54) EMERGENCY BRAKING SYSTEM AND METHOD USING ELECTRONIC PARKING BRAKE

(71) Applicant: HL MANDO CORPORATION, Gyeonggi-do (KR)

(72) Inventor: Jaehyun Park, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 161 days.

This patent is subject to a terminal disclaimer.

(21) Appl. No.: 18/233,287

(22) Filed: Aug. 11, 2023

(65) Prior Publication Data

US 2024/0336242 A1    Oct. 10, 2024

(30) Foreign Application Priority Data

Apr. 6, 2023    (KR) .......................... 10-2023-0045427

(51) Int. Cl.
*B60T 8/1763*    (2006.01)
*B60T 7/12*    (2006.01)
(Continued)

(52) U.S. Cl.
CPC .............. *B60T 8/1763* (2013.01); *B60T 7/12* (2013.01); *B60T 8/171* (2013.01); *B60T 8/172* (2013.01);
(Continued)

(58) Field of Classification Search
CPC .............. B60T 13/741; B60T 2210/12; B60T 2240/02; B60T 2250/04; B60T 2270/10; B60T 2270/402; B60T 7/12; B60T 8/171; B60T 8/172; B60T 8/17616; B60T 8/1763; B60T 8/885; B60T 8/92
See application file for complete search history.

(56) References Cited

U.S. PATENT DOCUMENTS 4,881,784 A * 11/1989 Leppek ............... B60T 8/17636
                                                            303/162
5,246,279 A *  9/1993 Onaka ..................... B60T 8/173
                                                            303/173
(Continued)

FOREIGN PATENT DOCUMENTS

KR        10-1307849      9/2013
KR     10-2014-0076743    6/2014

*Primary Examiner* — Carl C Staubach
(74) *Attorney, Agent, or Firm* — WOMBLE BOND DICKINSON (US) LLP

(57) ABSTRACT

Disclosed herein is an emergency braking system using an electronic parking brake according to the present disclosure, in which the emergency braking system is configured to provide an emergency braking using an electronic parking brake (EPB) in case of total or partial failure of a main braking system, and includes: an EPB actuator configured to apply an emergency braking force to a wheel; a slip detection unit configured to detect a wheel slip on the wheel equipped with the EPB actuator; an EPB control unit configured to determine a road surface condition by calculating a slip ratio through slip information transmitted from the slip detection unit, and to control an operation of the EPB actuator based on the road surface condition.

16 Claims, 7 Drawing Sheets

(51) Int. Cl.
    *B60T 8/171*     (2006.01)
    *B60T 8/172*     (2006.01)
    *B60T 8/1761*     (2006.01)
    *B60T 8/88*     (2006.01)
    *B60T 8/92*     (2006.01)
    *B60T 13/74*     (2006.01)

(52) U.S. Cl.
    CPC .......... *B60T 8/17616* (2013.01); *B60T 8/885* (2013.01); *B60T 8/92* (2013.01); *B60T 13/741* (2013.01); *B60T 2210/12* (2013.01); *B60T 2240/02* (2013.01); *B60T 2250/04* (2013.01); *B60T 2270/10* (2013.01); *B60T 2270/402* (2013.01)

(56) References Cited

U.S. PATENT DOCUMENTS

| | | | |
|---|---|---|---|
| 6,241,324 B1* | 6/2001 | Miyazaki | B60T 8/17636 |
| | | | 303/158 |
| 9,205,918 B2* | 12/2015 | Cahill | F16D 55/24 |
| 10,589,738 B1* | 3/2020 | Boecker | B60W 30/02 |
| 2014/0015310 A1* | 1/2014 | Hanzawa | B60T 13/741 |
| | | | 303/3 |
| 2016/0272176 A1* | 9/2016 | Furuyama | B60T 8/1761 |
| 2018/0029577 A1* | 2/2018 | Beauvais | B60T 8/176 |
| 2018/0072285 A1* | 3/2018 | Tanaka | F16D 55/226 |
| 2020/0317181 A1* | 10/2020 | Sun | B60T 7/12 |
| 2024/0336244 A1* | 10/2024 | Park | B60T 7/12 |

* cited by examiner

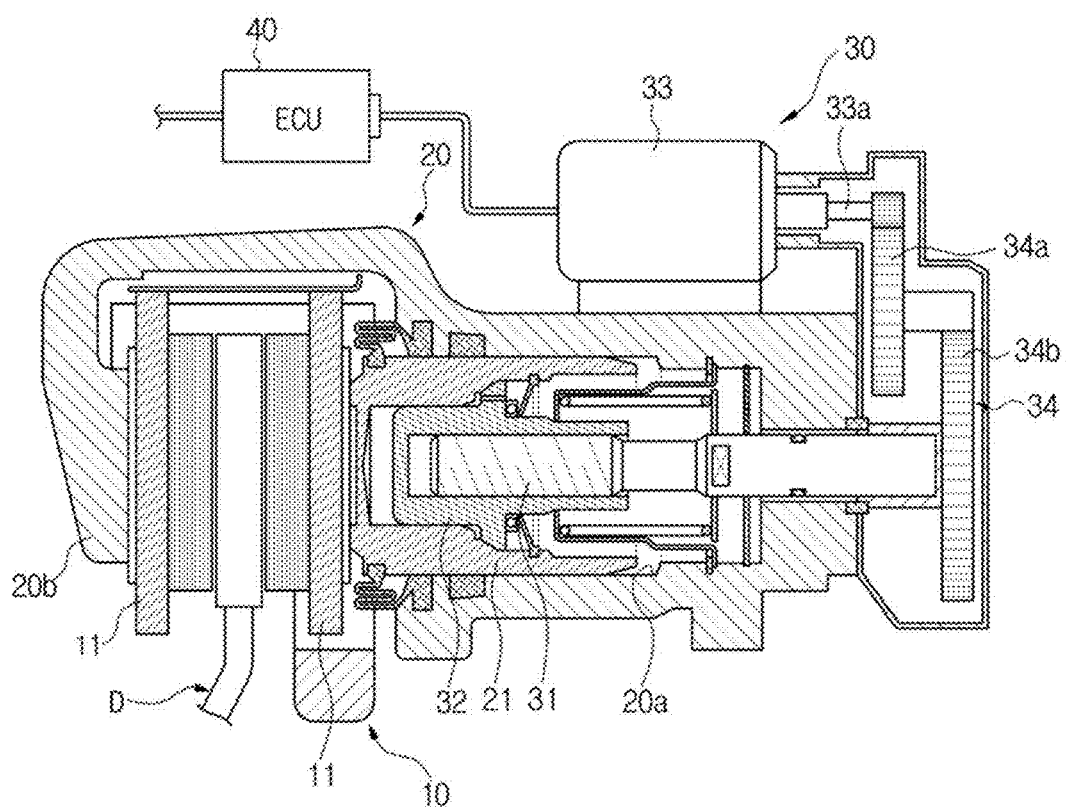
[FIG. 1]

[FIG. 2]
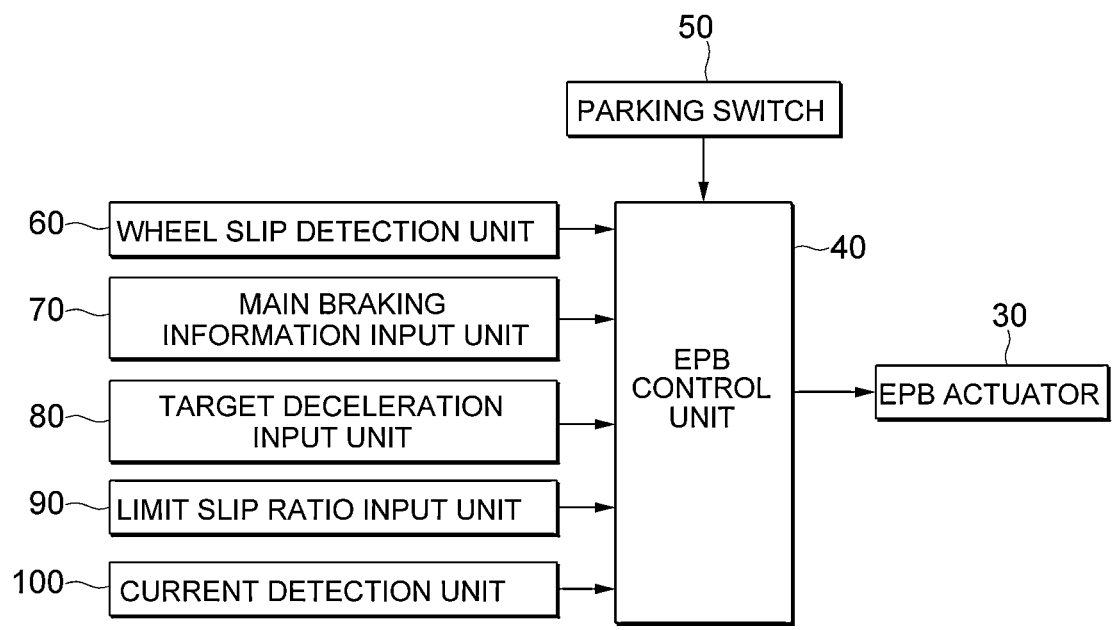

[FIG. 3A]
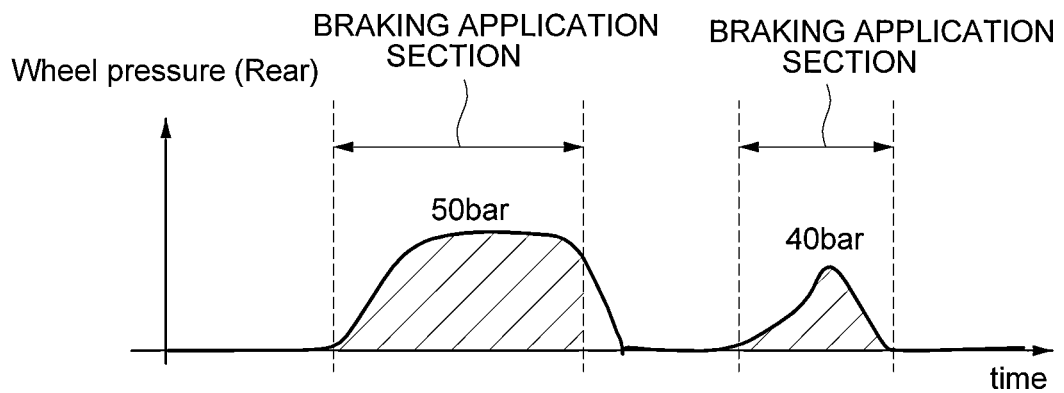
[FIG. 3B]
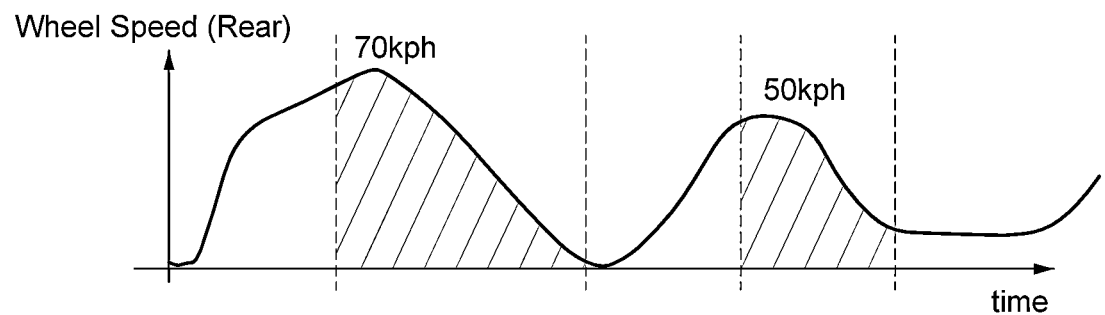
[FIG. 3C]
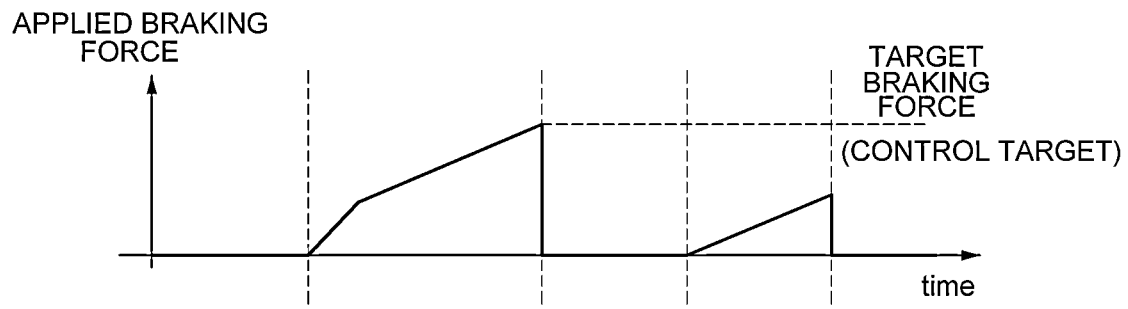

[FIG. 4A]
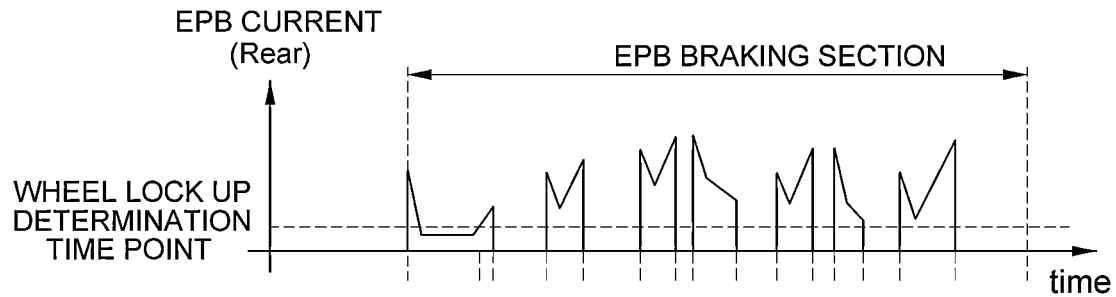
[FIG. 4B]
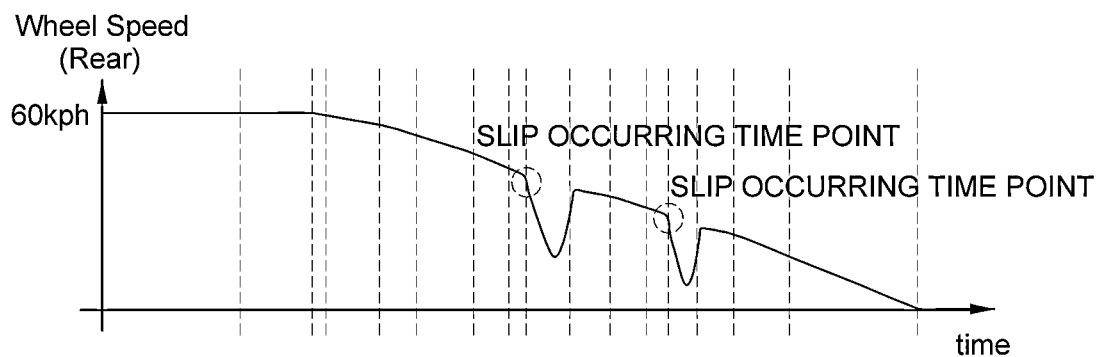
[FIG. 4C]
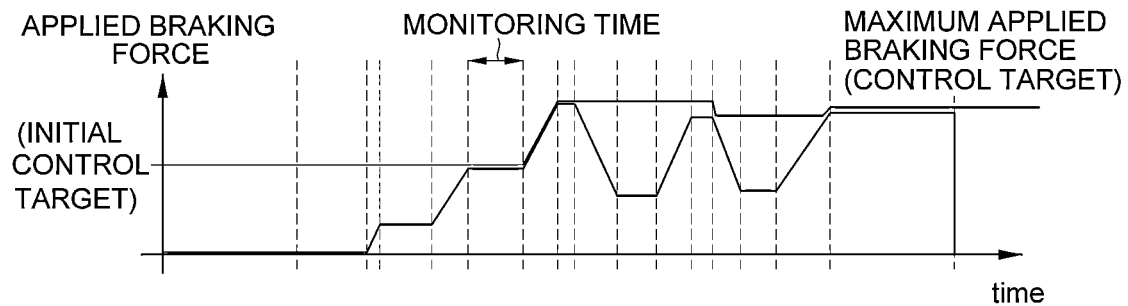

[FIG. 5A]
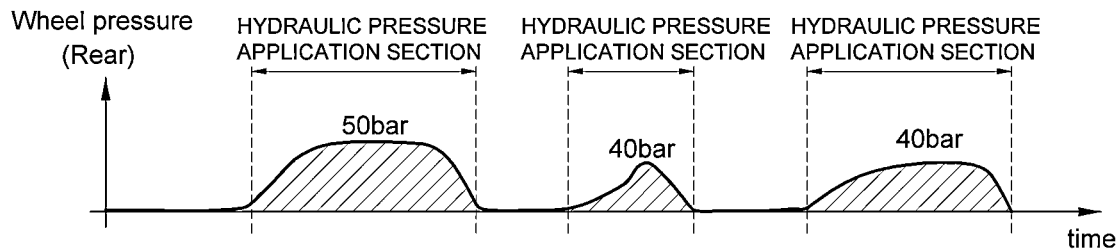
[FIG. 5B]
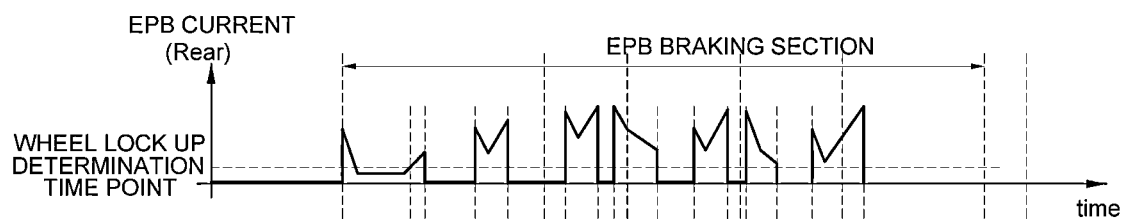
[FIG. 5C]
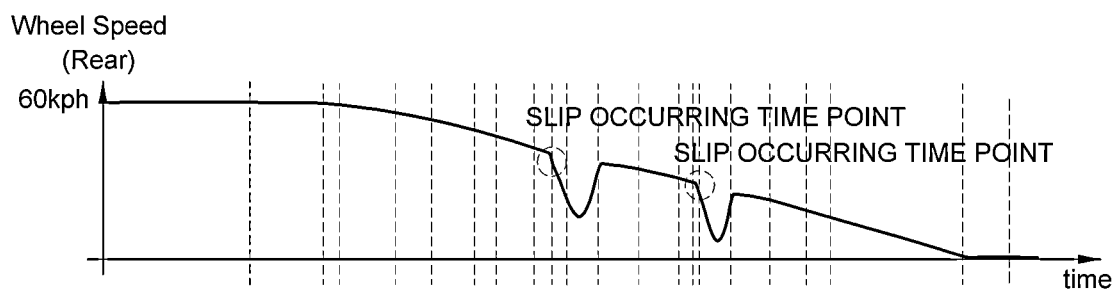
[FIG. 5D]
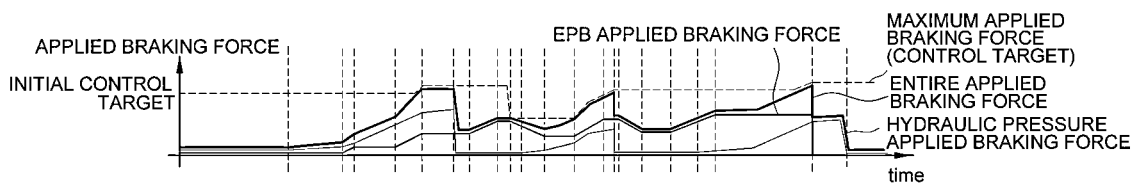

[FIG. 6]
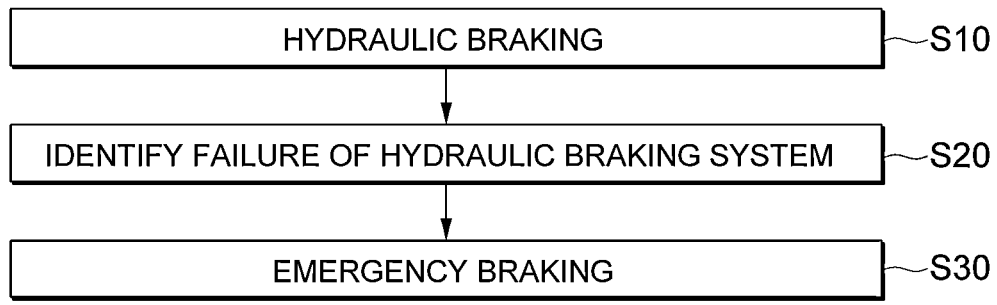
[FIG. 7]
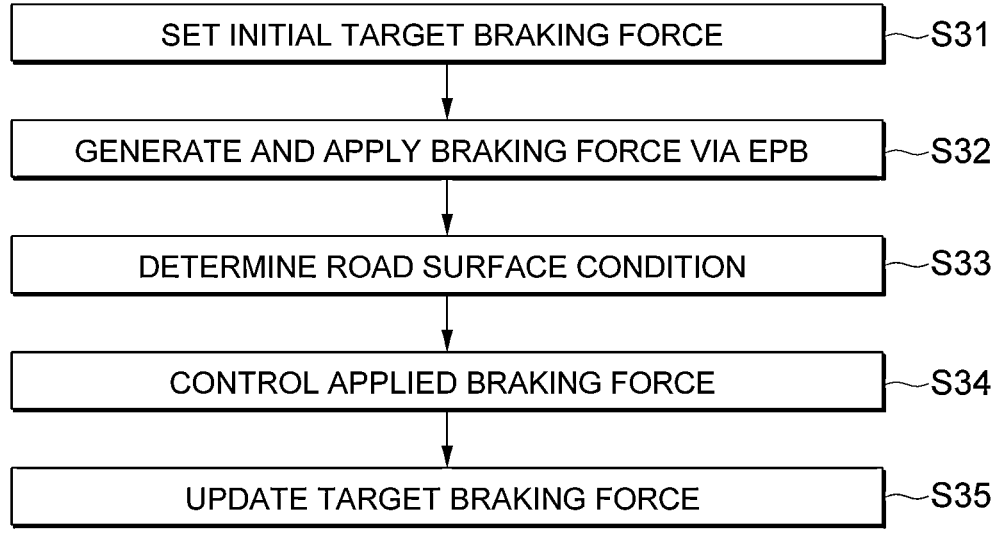

[FIG. 8]
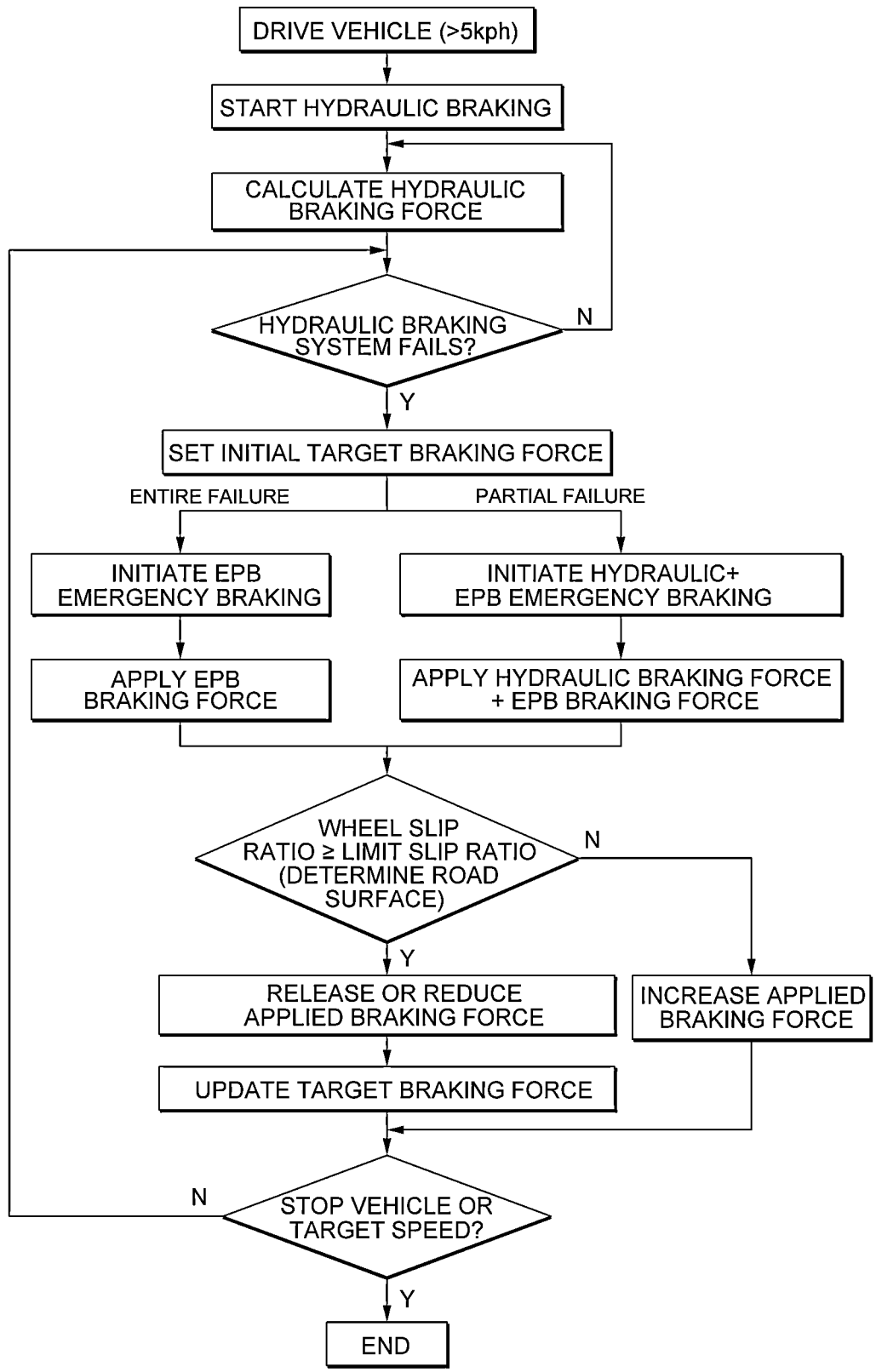

EMERGENCY BRAKING SYSTEM AND METHOD USING ELECTRONIC PARKING BRAKE

CROSS-REFERENCE TO RELATED APPLICATIONS

This application claims benefit and priority to Korean Patent Application No. 10-2023-0045427 filed on Apr. 6, 2023, with the Korean Intellectual Property Office, the disclosure of which is incorporated herein in its entirety by reference.

TECHNICAL FIELD

The present disclosure relates to an emergency braking system and an emergency braking method, and more particularly to an emergency braking system and an emergency braking method utilizing an electronic parking brake to perform emergency braking upon failure of a main braking system.

BACKGROUND

An electronic parking brake (EPB) has become increasingly popular in recent years as an alternative to traditional manual parking brakes such as hand levers and foot pedals. In addition to a simple function of keeping a vehicle stationary while parked, the electronification of the parking brake can provide a number of additional functions to improve driver comfort and safety, and indeed these functions can be found in a wide variety of vehicles.

One of these additional functions is an EPB dynamic braking function that brakes the traveling vehicle with an electronic parking brake (EPB). The EPB dynamic braking function allows the driver to apply an emergency brake to the vehicle in case of failure of a hydraulic brake installed in the vehicle.

That is, a dynamic braking function of the EPB, which is mounted on rear wheels of the vehicle, can be utilized to assist with braking deceleration of the vehicle while the vehicle is in motion, rather than when the vehicle is parked.

In the related art, the EPB dynamic braking function acts similar to ABS when the vehicle enters a low-friction road surface and a wheel lockup occurs. These functions are designed to control slipping of the wheels only when the wheel lockup has already occurred, making the vehicle less stable and less responsive to braking.

DOCUMENT OF RELATED ART

Patent Document (Patent Document 001) Korean Patent No. 10-1307849 (Sep. 12, 2013)
(Patent Document 002) Korean Patent Application Laid-Open No. 10-2014-0076743 (Jun. 23, 2014)

SUMMARY

The present disclosure aims to solve the problems in the related art, and has been made in an effort to provide an emergency braking system and an emergency braking method using an electronic parking brake that is capable of improving stability of an emergency braking control by constantly determining a road surface condition at the time of an emergency braking using an EPB and controlling an application of a braking force based on the road surface condition.

An exemplary embodiment of the present disclosure provides an emergency braking system using an electronic parking brake according to the present disclosure, the emergency braking system is configured to provide emergency braking using an electronic parking brake (EPB) in case of total or partial failure of a main braking system, and includes: an EPB actuator configured to apply an emergency braking force to a wheel; a slip detection unit configured to detect a wheel slip on the wheel equipped with the EPB actuator; an EPB control unit configured to determine a road surface condition by calculating a slip ratio through slip information transmitted from the slip detection unit, and to control an operation of the EPB actuator based on the road surface condition.

An initial target braking force in the time of an emergency braking is set to a predetermined value among braking force values transmitted to the wheels from the main braking system prior to the emergency braking. The initial target braking force may be set to a greatest braking force value of the braking force values transmitted to the wheels from the main braking system.

The emergency braking system according to the present disclosure further includes a main braking information input unit configured to input braking force information generated by the main braking system into the EPB control unit prior to the emergency braking.

At the beginning of the emergency braking, a braking force applied to the wheels increases until the initial target braking force is reached, and the initial target braking force is a value set in conjunction with the road surface condition prior to the emergency braking.

The slip detection unit includes a vehicle speed sensor configured to detect a speed of the vehicle and a wheel speed sensor configured to detect a speed of the wheel.

When the slip ratio reaches a limit slip ratio, a braking force applied to the wheels by the EPB actuator is released or reduced.

The emergency braking system using an electronic parking brake according to the present disclosure, further includes a limit slip ratio input unit configured to input a limit slip ratio to the EPB control unit.

The emergency braking system using an electronic parking brake according to the present disclosure, further includes a target deceleration input unit configured to input a target deceleration to the EPB control unit.

The emergency braking system using an electronic parking brake according to the present disclosure, further comprises a current detection unit configured to detect a current applied to a motor of the EPB actuator.

The emergency braking force applied to brake the vehicle in case of partial failure of the main braking system is a sum of a braking force applied through the main braking system and a braking force applied through the EPB actuator.

An emergency braking method using an electronic parking brake according to a preferred embodiment of the present disclosure for achieving the above-mentioned objects, the emergency braking method includes: (a) transmitting failure information on a main braking system to an EPB control unit; (b) performing emergency braking through the EPB actuator under a control of the EPB control unit; (c) determining a road surface condition by detecting a slip of a wheel equipped with the EPB actuator during the emergency braking and calculating a slip ratio; and (d)

releasing or reducing the braking force applied to the wheels from the EPB actuator when the slip ratio reaches a limit value in step (c).

The emergency braking method using an electronic parking brake according to the present disclosure, further includes (e) transmitting braking force information generated by the main braking system to the EPB control unit prior to the emergency braking.

A maximum braking force value of braking force values of the main braking system transmitted in step (e) is set as a target braking force at the beginning of the emergency braking.

The target braking force after step (d) is updated and set to an applied braking force value at a time point when the slip ratio reaches a limit value.

In case of failure of only a portion of the main braking system, the emergency braking is performed with a braking force applied from a braking system that is normal among the main braking system and a braking force applied from the EPB actuator.

A control of an operation of the EPB actuator is performed by controlling a current applied to a motor of the EPB actuator.

In step (c), after respectively detecting a speed of the vehicle and a speed of the wheel, the slip ratio is calculated using the two speeds, a road surface is determined to be a low-friction road surface as the slip ratio increases, and the road surface is determined to be a high-friction road surface as the slip ratio decreases.

According to the exemplary embodiments of the emergency braking system and the emergency braking method using the electronic parking brake of the present disclosure, in the process of the emergency braking through the EPB, the road surface condition is constantly determined and the emergency braking force transmitted to the wheels is controlled according to the road surface condition, so that the emergency braking control may be reliably performed, such as improving the stability of the vehicle and the braking response.

For example, on a high-friction road surface such as dry asphalt, the emergency braking control may be performed by focusing on a deceleration control in accordance with the target deceleration to shorten the braking time, while on a low-friction road surface such as wet or icy road, the slip ratio of the wheels may be determined to release or reduce the braking force to keep the posture of the vehicle stable.

At the beginning of the emergency braking, the EPB emergency braking response may be improved by rapidly increasing the emergency braking force delivered to the wheels until the emergency braking force reaches the initial control target value that is set according to the road surface condition.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a block diagram of an emergency braking system using an electronic parking brake, according to a preferred embodiment of the present disclosure.

FIG. 2 is a control flowchart of the emergency braking system using the electronic parking brake according to a preferred embodiment of the present disclosure.

FIGS. 3A to 3C are graphs of braking pressures, wheel speeds, and applied braking forces prior to the emergency braking when a hydraulic braking system is operating normally.

FIGS. 4A to 4C are graphs illustrating a process of the emergency braking using the electronic parking brake according to a preferred embodiment of the present disclosure upon total failure of the hydraulic braking system.

FIGS. 5A to 5D are graphs illustrating a process of the emergency braking using the electronic parking brake according to a preferred embodiment of the present disclosure upon partial failure of the hydraulic braking system.

FIG. 6 is a flowchart schematically illustrating an entire process of braking in a vehicle with the present disclosure applied.

FIG. 7 is a flowchart illustrating the process of the emergency braking in the vehicle with the present disclosure applied.

FIG. 8 is a flowchart illustrating the entire process of the emergency braking using the emergency braking system with the electronic parking brake, according to a preferred embodiment of the present disclosure.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an emergency braking system and method using an electronic parking brake according to a preferred embodiment of the present disclosure will be described in detail with reference to the accompanying drawings.

FIG. 1 is a block diagram of an emergency braking system using an electronic parking brake, according to a preferred embodiment of the present disclosure.

The emergency braking system using the electronic parking brake according to the present disclosure, includes a carrier 10, a caliper housing 20, an EPB actuator 30, and an EPB control unit 40.

The carrier 10 is coupled to a vehicle body and is provided internally with a pair of friction pads 11 spaced apart with a disk D therebetween.

The caliper housing 20 is forward and backward movably mounted on the carrier 10 and is provided with a cylinder portion 20a in which a piston 21 is forward and backward movably mounted to compress the disk D with the friction pads 11 and a finger portion 20b on the other side.

The EPB actuator 30 includes an operating shaft 31 rotatably installed within the cylinder portion 20a of the caliper housing 20, a pressing sleeve 32 installed on an inner side of the piston 21 to press or depress the piston 21 while moving forward and backward by rotation of the operating shaft 31, a motor 33 configured to cause the operating shaft 31 to rotate forwardly and reversely, and a speed reduction gear assembly 34 including a plurality of gears 34a and 34b and configured to transmit power generated on a rotating shaft 33a of the motor 33 to the operating shaft 31 but with a reduced number of revolutions.

The EPB control unit 40 controls an operation of the EPB actuator 30 by controlling a current applied to the motor 33.

FIG. 2 is a control flowchart of the emergency braking system using the electronic parking brake according to a preferred embodiment of the present disclosure.

The EPB control unit 40 receives various external signals and automatically controls the operation of the EPB actuator 30 based on the signals. A parking switch 50, a slip detection unit 60, a main braking information input unit 70, a target deceleration input unit 80, a limit slip ratio input unit 90, and a current detection unit 100 are connected to an input side of the EPB control unit 40. The motor 33 of the EPB actuator 30 is connected to an output side of the EPB control unit 40.

The parking switch 50 transmits a signal for an operation for applying the EPB actuator 30 to the EPB control unit 40 when operated on by a driver, and a signal for an operation release to the EPB control unit 40 when operated off by the driver. The parking switch 50 is primarily used for parking the vehicle, but is not limited thereto, and may also be used, as in the present disclosure, when emergency braking is required due to failure of a main braking system, i.e., a hydraulic braking system.

The slip detection unit 60 includes a vehicle speed sensor (not illustrated) and a wheel speed sensor (not illustrated). The vehicle speed sensor detects a traveling speed of the vehicle, and the wheel speed sensor detects a rotational speed of a wheel.

In general, a contact portion of a rotating wheel (tire) in contact with the ground is deformed by a driving or braking force, and partially slides even before the wheel is locked. The degree of slipping that occurs between the wheel and the road surface is called a slip ratio and is calculated as the following Equation.

$$\text{Slip rate} = \frac{\text{Vehicle traveling speed} - \text{Wheel speed}}{\text{Vehicle traveling speed}} \times 100(\%) \quad \text{(Equation 1)}$$

When the wheels are fully locked and slip with no rotation during braking, a braking slip ratio is 100% because there is no rotation of the wheels. Braking friction coefficient varies depending on a road surface condition, so the slip ratio varies as well. A road surface may be determined to be a low-friction road surface as the slip ratio increases, and a high-friction road surface as the slip ratio decreases.

The main braking information input unit 70 is a part where data information such as braking pressure applied to the wheels, a speed of the wheels, and an applied braking force is input to the EPB control unit 40 when the main braking system, i.e., the hydraulic braking system, is normally operated before the emergency braking starts. In addition, the emergency braking may be performed even when a part of the hydraulic braking system fails, and in this case, not only the data information when the entire hydraulic system is normally operated, but also the data information of the braking system that is normally operated among the hydraulic braking system at the time of the emergency braking is input to the EPB control unit 40 through the main braking information input unit 70.

The target deceleration input unit 80 is a part that inputs a target deceleration required in case of the emergency braking to the EPB control unit 40 in advance. That is, the target deceleration required in case of the emergency braking may be input in advance before the vehicle leaves the factory.

The limit slip ratio input unit 90 is a part that inputs a limit slip ratio to the EPB control unit 40. The limit slip ratio may be set to a slip ratio at a time point when a vehicle body starts to rotate under braking due to a low coefficient of friction on the road surface.

The current detection unit 100 detects a current flowing in the motor 33 and transmits the detection signal to the EPB control unit 40, thereby engaging in a control of an operation of the motor 33. Through the current detection unit 100, an applied value of the current applied to the motor 33 is detected for each operating time, which allows an amount of braking torque to be calculated, and the applied value of the current is compared with the amount of braking torque to control the operation of the motor 33.

FIG. 3 is a graph of braking pressures, wheel speeds, and applied braking forces prior to the emergency braking when a hydraulic braking system is operating normally. In particular, FIG. 3 is a graph illustrating an operational state at the rear wheels equipped with the EPB actuator 30.

FIG. 3A illustrates that the braking pressure is divided and applied in two separate sections. A braking pressure of 50 bar was applied in a first braking section at the beginning of braking and a braking pressure of 40 bar was applied in a second braking section. There is a time difference between the two braking sections.

FIG. 3B illustrates a change in wheel speed when the braking pressure is applied. It is illustrated that the speed of the wheel increases before the braking pressure is applied, and that the speed of the wheel increases briefly during the first braking section, but then gradually decreases after a maximum speed of 70 kph. The trend as described above is also similarly seen in the second braking section.

FIG. 3C illustrates a change in braking force when the braking pressure is applied. It may be confirmed that a total braking force generated in the first braking section, where a relatively large amount of braking pressure is applied, is greater than a total braking force generated in the second braking section. In addition, it may be confirmed that the braking force value at the time point when the braking force is lastly applied in the first braking section is the largest. The braking force at this time point may be an initial target braking force for subsequent emergency braking, i.e., an initial control target.

Various information obtained through FIGS. 3A to 3C above is stored in a main control unit (not illustrated) of the hydraulic braking system, and is input to the EPB control unit 40 through the main braking information input unit 70 at the time of emergency braking.

The change in the braking force, the speed of the wheel, and the applied braking force illustrated in FIG. 3 is an example of when the hydraulic braking system is operating normally, and even when the hydraulic braking system is operating normally, the slip rate of the wheel is calculated in real time, so that the road surface condition may be determined in real time.

FIG. 4 is a graph illustrating a process of the emergency braking using the electronic parking brake according to a preferred embodiment of the present disclosure upon total failure of the hydraulic braking system. FIG. 4 illustrates a change in current applied to the motor, a change in wheel speed, and a change in applied braking force for the rear wheels equipped with EPB actuators.

FIG. 4A illustrates a variation in current applied to the motor 33 that constitutes the EPB actuator 30 in an emergency braking section. The current is not continuously applied during the emergency braking section but is divided and applied in multiple times, and between each current application section, there is a gap where the current application is either temporarily paused or applied minimally.

FIG. 4B illustrates a change in speed as the vehicle traveling at a wheel speed of 60 kph is decelerated by the emergency braking. The vehicle is traveling at the wheel speed of 60 kph and begins to decelerate shortly after the current is applied to the motor. It may be confirmed that the wheel speed decreases rapidly at two time points when the limit slip ratio is reached during the deceleration process. When the slip ratio between the road surface and the vehicle reaches the limit slip ratio, it may be seen that the road surface is in a low-friction road surface state with a low coefficient of friction enough to stop or significantly reduce the rotation of the wheels.

FIG. 4C illustrates a change in braking force applied to the wheels in the emergency braking section. As illustrated in the drawing, it may be confirmed that the change in braking force is not continuous, but that there are gaps where the change is temporarily stopped. A form of braking force application is similar to a form of current application. That is, it may be confirmed that the change in braking force is also temporarily stopped at the time point when the current application is temporarily stopped.

As illustrated in FIG. 4C, the initial emergency braking response may be improved by rapidly increasing the applied braking force up to the initial target braking force, i.e., the initial control target, after the emergency braking is initiated.

The initial control target may be set to a maximum braking force that was applied when the hydraulic braking system was operating normally prior to the emergency braking, as illustrated in FIG. 3C. In particular, the initial control target is the maximum braking force applied by determining the road surface condition in real time before the emergency braking. Therefore, even if the emergency braking initial target braking force is applied rapidly, the slip ratio does not change much, which may improve the emergency braking response while maintaining the stability of the vehicle.

For reference, the initial control target is a value that is set in conjunction with the road surface condition before the emergency braking. That is, on the high-friction road surface, the initial control target value will also be set high, and on the low-friction road surface, the initial control target value will be set low.

During the emergency braking process, when the braking force reaches the initial control target, an increase in the applied braking force is temporarily stopped to allow for monitoring time to identify the road surface condition. That is, the road surface condition is determined by identifying whether the slip ratio changes during the monitoring time. During this time, if it is determined that the slip ratio does not change significantly and the friction on the road is favorable, the applied braking force increases until the slip ratio of the vehicle reaches the limit slip ratio.

During the emergency braking, when the slip ratio reaches a point where the limit slip ratio is reached, a control that focuses on controlling a posture of the vehicle body rather than a deceleration is performed by releasing or reducing the applied braking force. The process in which the applied braking force is released or reduced may be controlled by reducing the amount of current being applied to the motor.

A reference slip ratio that is a reference for releasing or reducing the applied braking force may be set to a time point when the wheels are fully locked and the wheel speed is zero, or may be set based on a time point when the wheel speed is not zero but the vehicle body is less stable.

When the slip ratio reaches the limit slip ratio and the applied braking force is released or reduced to stabilize the posture of the vehicle body and the slip ratio falls below the limit slip ratio, the applied braking force increases by changing the amount of current being applied to the motor. In this case, the target braking force that becomes the control target may be set to an applied braking force value at a point where the slip ratio is the limit slip ratio.

In FIG. 4C, there is one more point at which the limit slip ratio is reached, at which time the applied braking force is temporarily released or reduced, and then the target braking force, which becomes the control target, may be set to a second time point at which the slip ratio reaches the limit slip ratio. As described above, the target braking force may be automatically updated based on the road surface condition.

FIG. 5 is a graph illustrating a process of the emergency braking using the electronic parking brake according to a preferred embodiment of the present disclosure upon partial failure of the hydraulic braking system. FIG. 5 illustrates a change in the hydraulic braking pressure, a change in the current applied to the motor, a change in the wheel speed, and a change in the applied braking force for the rear wheels equipped with the EPB actuator.

FIG. 5A illustrates the change in the hydraulic pressure applied to the rear wheels by a normally functioning part of the hydraulic braking system. The hydraulic pressure may be divided and applied in multiple sections (50 bar, 40 bar, and 40 bar). It may be controlled in such a manner that the braking force applied by the normally operating hydraulic braking system of the hydraulic braking system acts as the main braking force in the time of the emergency braking and any insufficient braking force may be supplemented by the braking force generated through the operation of the EPB actuator 30.

FIG. 5B illustrates a change in the current applied to the motor 33 of the EPB actuator 30 in the emergency braking section, and FIG. 5C illustrates that the speed of the rear wheel decelerates over time. In FIG. 5C, there are two points where the slip ratio reaches the limit slip ratio.

FIG. 5D illustrates that in the emergency braking section, the braking force applied by the hydraulic braking system and the braking force applied by the EPB actuator 30 are combined to generate an emergency braking force, and the way they change.

As illustrated in FIG. 5D, changes in the wheel speed and the applied braking force have a different trend from in FIG. 4C. That is, there is a difference between FIG. 4C, in which only the braking force by the EPB actuator 30 is considered, and FIG. 5D, in which both the braking force by the hydraulic braking system and the braking force by the EPB actuator 30 are considered.

However, as illustrated in FIG. 5D, it may be confirmed that the target braking force is being updated based on the road surface condition.

FIG. 6 is a flowchart schematically illustrating an entire process of braking in a vehicle with the present disclosure applied.

An overall process of braking in a vehicle adopting the emergency braking system using the electronic parking brake, according to a preferred embodiment of the present disclosure, includes a step of hydraulic braking (S10), a step of identifying a hydraulic braking system failure (S20), and a step of emergency braking (S30).

The step of hydraulic braking S10 is performed when the entire hydraulic braking system is operating normally without any failure, which may also be performed even in a case of failure of a component that does not affect hydraulic braking. The step of hydraulic braking (S10) goes through a process in which a pad is pressed against a disk by the hydraulic pressure, and the pressing and releasing of the disk is performed repeatedly. That is, the hydraulic pressure is applied and released repeatedly, rather than continuously.

While the speed of the wheels decreases and increases in response to the hydraulic application cycle, the speed of the wheels decelerates.

The braking force application increases and decreases in response to the hydraulic application cycle and the increasing and decreasing cycle of the wheel speed. A maximum braking force value applied to the wheels during hydraulic braking becomes the initial target braking force for subsequent emergency braking, i.e., the initial control target.

In the step S20 of checking the hydraulic braking system failure, it is identified whether the hydraulic braking system has failed and the identified information is transmitted to the EPB control unit 40. That is, when the hydraulic braking is in progress and the braking force is reduced due to failure of a component that influences the braking force, the main control unit of the hydraulic braking system determines whether there is failure and transmits a signal for the failure to the EPB control unit 40.

When the hydraulic braking system fails and the driver is notified via a warning signal, such as a warning light, the driver may operate the parking switch in an emergency to transmit a control signal to the EPB control unit 40.

The present embodiment describes a case in which when the hydraulic braking system fails, a signal for the failure is automatically transmitted to the EPB control unit 40, and emergency braking is automatically controlled by the control of the EPB control unit 40.

In the step of emergency braking (S30), when the entire hydraulic braking system fails, the braking force is applied only by the operation of the EPB actuator 30, and when only a part of the hydraulic braking system fails, the braking force is applied by a combination of the operation of the normally operating hydraulic system and the operation of the EPB actuator 30.

FIG. 7 is a flowchart illustrating the process of the emergency braking in the vehicle with the present disclosure applied.

The step of emergency braking (S30) includes a step of setting an initial target braking force (S31), a step of generating and applying braking force through the EPB (S32), a step of determining a road surface condition (S33), a step of controlling the applied braking force (S34), and a step of updating the target braking force (S35).

In the step of setting the initial target braking force (S31), the maximum hydraulic braking force applied before the emergency braking may be selected as the initial target braking force for emergency braking as described above.

In the step S32 of generating and applying braking force through the EPB, a current is applied to the motor 33 of the EPB actuator 30 to drive the motor 33, and the driving force is transmitted to the friction pad 11 through the speed reduction gear assembly 34 and the piston 21, thereby applying the braking force to the wheels.

In the step of determining the road surface condition (S33), the road surface condition is constantly determined in real time using the slip ratio in the process of emergency braking. The road surface may be determined to be a low-friction road surface as the slip ratio is larger, and the road surface may be determined to be a high-friction road surface as the slip ratio is smaller.

In the step of controlling the applied braking force (S34), when the slip ratio reaches the limit slip ratio, the braking force applied to the wheels is released or reduced to perform a control that maintains the correct posture of the vehicle rather than decelerating the vehicle, and before the slip ratio reaches the limit slip ratio, a control that decelerates the vehicle is performed.

In the step of updating the target braking force (S35), when the slip ratio reaches the limit slip ratio and the applied braking force is released or reduced, the process of updating the applied braking force at the time point of reaching the limit slip ratio to the target braking force is performed. When the limit slip ratio is reached multiple times during the emergency braking section, the target braking force is updated multiple times.

As described above, in the process of emergency braking, a target value of the applied braking force is frequently updated in response to the road surface condition, and the applied braking force is controlled based on the target braking force, thereby enabling the emergency braking of the vehicle to be stably performed.

FIG. 8 is a flowchart illustrating the entire process of the emergency braking using the emergency braking system with the electronic parking brake, according to a preferred embodiment of the present disclosure.

The entire process from the hydraulic braking described above to stopping the vehicle via the emergency braking will be reviewed with reference to the attached flowchart in FIG. 8.

When the driver presses the brake pedal while driving the vehicle, the hydraulic braking system is activated to initiate the hydraulic braking. The braking pressure, the wheel speed, and the applied braking force in the process of hydraulic braking are stored in real time in the main control unit.

In the process of the hydraulic braking, the main control unit that controls the hydraulic braking checks whether the hydraulic braking system fails in real time. When the hydraulic braking system is operating normally with no failures, or when only a component that is not involved in braking fails, the normal hydraulic braking process is performed repeatedly.

When a component that may cause braking problems fails while checking whether the hydraulic braking system fails, the emergency braking is performed. In this case, it may be determined that the entire hydraulic braking system has failed, or only a portion of the hydraulic braking system has failed. For example, the vehicle has the hydraulic brake actuators on each of the front and rear wheels, and only some of the actuators may fail.

Depending on whether the entire hydraulic braking system has failed or a portion of the hydraulic braking system has failed, different forms of the emergency braking are performed.

In case that the entire hydraulic braking system fails, the emergency braking is performed only by the EPB emergency braking force through the EPB actuator 30. In case that part of the hydraulic braking system fails, the emergency braking is performed by the combined braking force generated and applied by both the hydraulic braking system and the EPB actuator 30.

In the process that the emergency braking is performed, the wheel slip is detected in real time and the slip ratio is calculated in real time. When the slip ratio is greater than or equal to a preset limit slip ratio, the road surface condition is determined to be poor (low-friction road surface), and the applied braking force is released or reduced to stabilize the control of the posture of the vehicle body. When the slip ratio is less than the limit slip ratio, the road surface condition is determined to be good (high-friction road surface) and the applied braking force increases.

After the process in which the slip ratio reaches the limit slip ratio and the applied braking force is released or reduced has been completed, the target braking force is automatically updated to the applied braking force at the time point when the limit slip ratio is reached.

The process described above is repeated until the vehicle finally stops or the vehicle decelerates to the target speed.

As described above, the emergency braking system and the emergency braking method using the electronic parking brake according to the preferred embodiments of the present disclosure have been described in detail with reference to the accompanying drawings, but the present disclosure is not limited to the above-described embodiments and may be practiced in various variations within the scope of the patent claims.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An emergency braking system configured to provide an emergency braking using an electronic parking brake (EPB) in case of total or partial failure of a main braking system, the emergency braking system comprising:
    an EPB actuator configured to apply an emergency braking force to wheels;
    a slip detection unit configured to detect a wheel slip on the wheels equipped with the EPB actuator; and
    an EPB control unit configured to constantly determine a road surface condition by calculating a slip ratio through slip information transmitted from the slip detection unit, and to control an operation of the EPB actuator based on the road surface condition,
    wherein an initial target braking force is set to a maximum braking force value of braking force values transmitted to the wheels from the main braking system prior to the emergency braking.

2. The emergency braking system of claim 1, further comprising a main braking information input unit configured to input braking force information generated by the main braking system into the EPB control unit prior to the emergency braking.

3. The emergency braking system of claim 1, wherein a braking force applied to the wheels increases until the initial target braking force is reached at the beginning of the emergency braking, and
    wherein the initial target braking force is a value set in conjunction with the road surface condition prior to the emergency braking.

4. The emergency braking system of claim 1, wherein the slip detection unit comprises:
    a vehicle speed sensor configured to detect a speed of the vehicle; and
    a wheel speed sensor configured to detect a speed of the wheel.

5. The emergency braking system of claim 1, wherein a braking force applied to the wheels by the EPB actuator is released or reduced when the slip rate reaches a limit slip ratio.

6. The emergency braking system of claim 5, further comprising a limit slip ratio input unit configured to input the limit slip ratio to the EPB control unit.

7. The emergency braking system of claim 1, further comprising a target deceleration input unit configured to input a target deceleration to the EPB control unit.

8. The emergency braking system of claim 1, further comprising a current detection unit configured to detect a current being applied to a motor of the EPB actuator.

9. The emergency braking system of claim 1, wherein the emergency braking force applied to brake the vehicle in case of partial failure of the main braking system is a sum of a braking force applied through the main braking system and a braking force applied through the EPB actuator.

10. An emergency braking method using an electronic parking brake comprising:
    (a) transmitting failure information on a main braking system to an EPB control unit;
    (b) performing an emergency braking through an EPB actuator under a control of the EPB control unit;
    (c) determining a road surface condition by detecting a slip of a wheel equipped with the EPB actuator during the emergency braking and calculating a slip ratio; and
    (d) releasing or reducing the braking force applied to the wheels from the EPB actuator when the slip ratio reaches a limit value in step (c),
    wherein a target braking force at beginning of the emergency braking is set to a maximum braking force value among braking force values applied to the wheels during a normal operation of the main braking system prior to the emergency braking.

11. The emergency braking method of claim 10, wherein after the emergency braking is initiated, an application of braking force increases until the applied braking force reaches the initial target braking force.

12. The emergency braking method of claim 10, further comprising (e) transmitting braking force information generated by the main braking system to the EPB control unit prior to the emergency braking.

13. The emergency braking method of claim 10, wherein the target braking force after step (d) is updated and set to an applied braking force value at a time point when the slip ratio reaches a limit value.

14. The emergency braking method of claim 10, wherein in case of failure of only a portion of the main braking system, the emergency braking is performed with a braking force applied from a braking system that is normal among the main braking system and a braking force applied from the EPB actuator.

15. The emergency braking method of claim 10, wherein a control of an operation of the EPB actuator is performed by controlling a current applied to a motor of the EPB actuator.

16. The emergency braking method of claim 10, wherein in step (c), after respectively detecting a speed of the vehicle and a speed of the wheel, the slip ratio is calculated using the two speeds, and
    wherein a road surface is determined to be a low-friction road surface as the slip ratio increases, and the road surface is determined to be a high-friction road surface as the slip ratio decreases.

* * * * *